C. O. LUCAS.
MILK PUMP.
APPLICATION FILED JAN. 13, 1909.

940,651.

Patented Nov. 16, 1909.
2 SHEETS—SHEET 1.

Witnesses
M. Sieber.
C. M. Theobald.

C. O. Lucas,
Inventor

By R. J. McCarty,
his Attorney

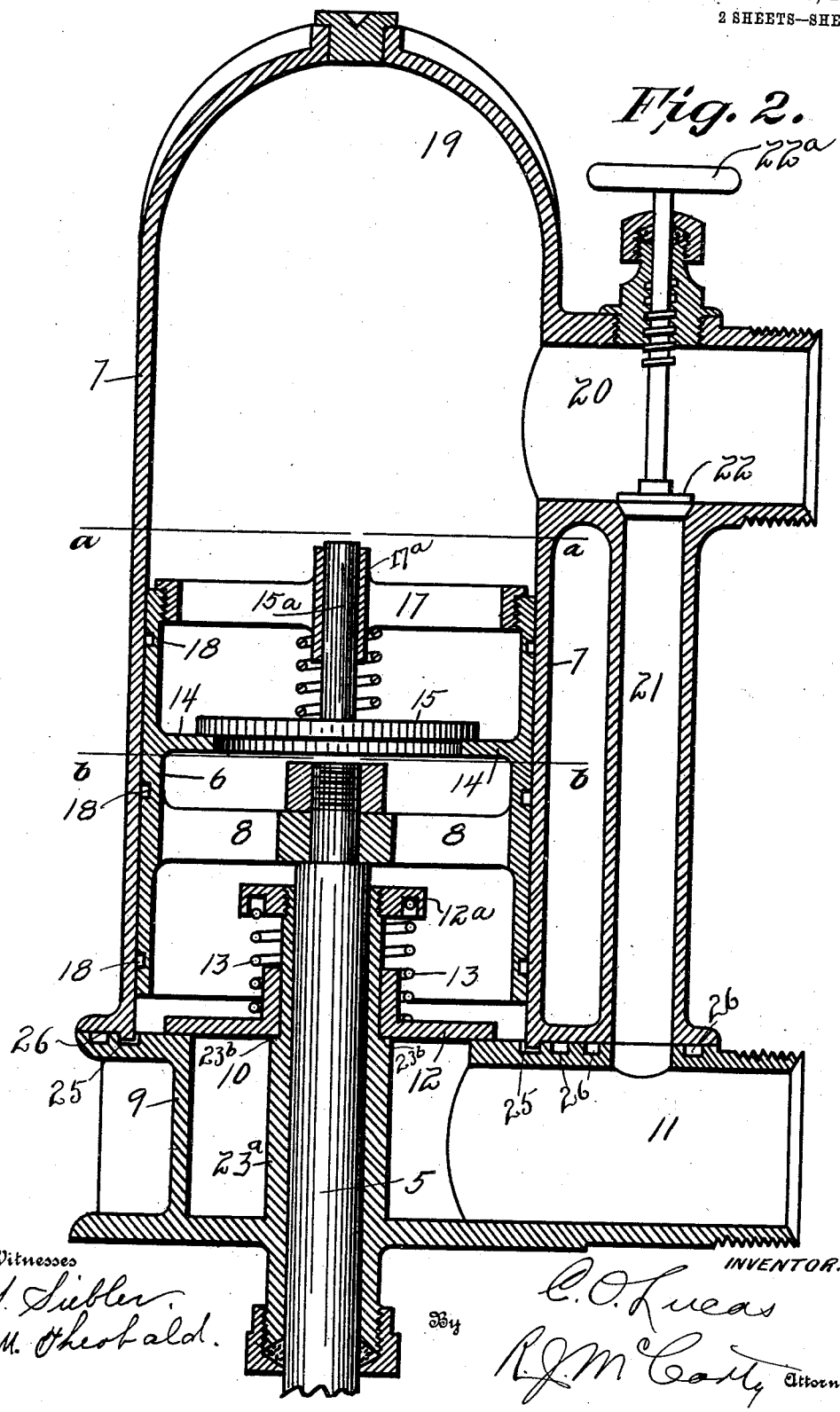

UNITED STATES PATENT OFFICE.

CHARLES O. LUCAS, OF DAYTON, OHIO, ASSIGNOR TO THE LUCAS PUMP CO., OF DAYTON, OHIO.

MILK-PUMP.

940,651.  Specification of Letters Patent.  Patented Nov. 16, 1909.

Application filed January 13, 1909. Serial No. 472,068.

*To all whom it may concern:*

Be it known that I, CHARLES O. LUCAS, a citizen of the United States, residing at Dayton, in the county of Montgomery and State of Ohio, have invented certain new and useful Improvements in Milk-Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in milk pumps.

The object of the invention is to provide a milk pump which meets the most exacting requirements of the sanitary laws relating to milk traffic. To this end, the further object of the invention is to construct a pump for the above purposes which may be easily taken apart at any time for the purpose of cleaning the same, and in which there are no sharp corners, recesses, cavities, etc., or inaccessible places for the accumulation of milk and the propagation of germs.

Figure 1:
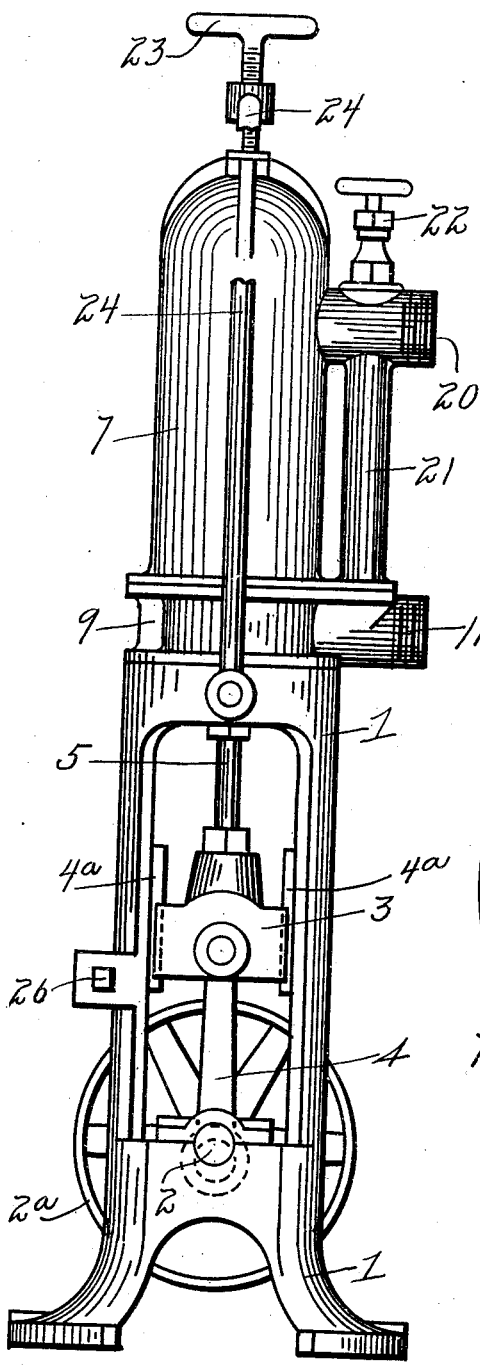
Figure 3:
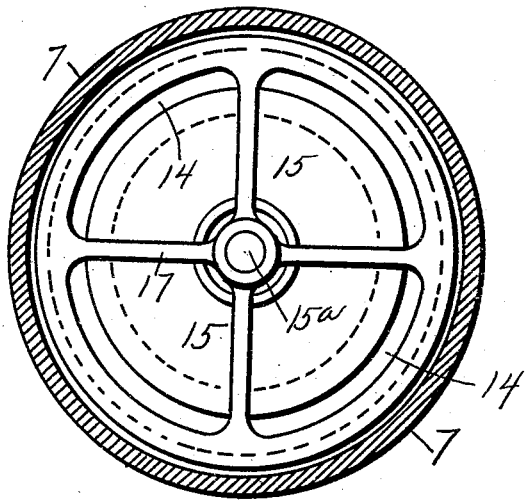
Figure 4:
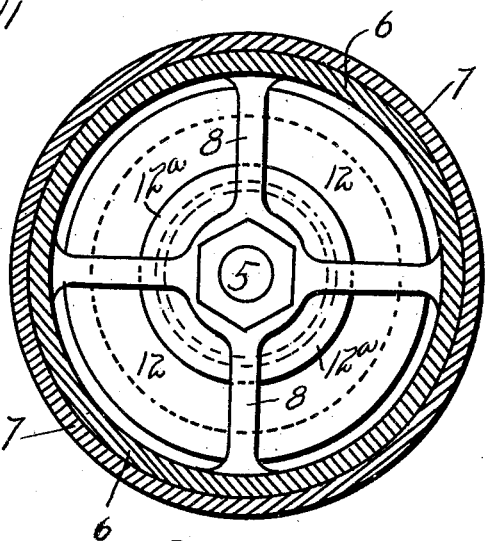

In the annexed drawings, Figure 1, is a side elevation of my improved milk pump. Fig. 2, is a vertical sectional elevation through the pump cylinder, disclosing that portion of the pump lying above the base. Fig. 3, is a cross section on the line *a a* of Fig. 2. Fig. 4, is a cross section on the line *b b* of Fig. 2.

In a detail description of the invention, similar reference characters indicate corresponding parts.

The main base 1 is of suitable construction and provides bearings for a crank shaft 2 which is driven from a belt pulley 2$^a$. The crank shaft is connected to a cross head 3 by a pitman 4, said cross head moving on guides 4$^a$ supported on the base. The cross head is connected with a piston rod 5, the upper end of which is attached to a piston 6 within the cylinder. This piston reciprocates through means of attachment with the piston rod through a spider 8 which spans the interior of the piston and does not obstruct the free passage of milk in the operations of the pump. The cylinder 7 is mounted upon a sub-base 9 which is supported on the main base 1. This sub-base has a hub on the interior thereof indicated by 23$^a$, and which is an integral part thereof and extends therethrough to points above and below the sub-base. The upper portion of said hub is reduced in diameter to provide an annular ledge or seat 23$^b$ which is in a plane with the upper side of said sub-base, and together with the upper side the sub-base provides a seat for the valve 12 which seals the cylinder from the chamber in the sub-base. The chamber 10 in the sub-base communicates with a lateral inlet 11, and the valve 12 lies above said chamber 10 and is adapted to uniformly seat upon the annular shoulder 23$^b$ of the hub, and the upper side of the sub-base as before stated. The valve 12 controls the admission of milk from the sub-base chamber to the cylinder of the pump, and when seated it seals the cylinder from said sub-base chamber. A spring 13 surrounds the tubular extension of the valve 12 and lies between said valve and a cap 12$^a$ which is screw-threaded to the upper end of the hub 23$^a$, which extends above the sub-base and, as we have seen, is an integral part of said sub-base. The spring 13 exerts pressure on the valve 12 to seat it when the piston is not moving up. The top of the sub-base has an annular groove 25 which receives a corresponding bead or projection on the lower end of the pump cylinder and serves as a means for centering said parts in mounting the cylinder. Also, the top of the sub-base and the casting forming the lateral inlet 11 have annular packing grooves 26 which seal the joint between the sub-base and the cylinder.

The upper portion of the piston 6 supports a valve 15 adapted to seat upon an inwardly-extended annular ledge 14 which provides such seat. The stem 15$^a$ of this valve projects loosely through the hub 17$^a$ of a spider 17, which is connected to the upper end of the piston in any suitable way. The valve 15 controls the passage of milk through the piston to the cylinder. The piston is provided with suitable packing grooves 18 which seal the piston and the cylinder to prevent any passage between these two members. In the upper part of said cylinder an air chamber 19 is provided between which and the lower part of the cylinder an outlet 20 is arranged, said outlet being parallel with the inlet 11. The outlet 20 and the inlet 11 are connected by a bypass 21 which is controlled by a valve 22, the stem of which projects across the outlet 20 and is provided with a hand wheel 22ª for manipulation. When it is desired to decrease or regulate the discharge from the pump, the valve 22 may be adjusted to permit the milk to pass through the by-pass 21 into the inlet 11 and back to the pump, thus decreasing the discharge of milk from the pump in proportion to the amount passing through the by-pass. The cylinder and the sub-base are easily detachable from the main base and from each other to cleanse the same, and when these parts are held in position, they are secured by means of a hand screw 23 at the top of the pump which screws through a yoke 24 and spans the cylinder vertically and is pivoted to opposite sides of the main base.

It will be observed, the piston and valves and the parts coöperating therewith, are especially designed to be free from recesses or cavities which would afford a convenient place for the lodgment of milk, and which would be difficult to cleanse, and would result in the propagation of bacteria. The piston is given a comparatively short stroke to avoid churning the milk; it is driven from the pulley 2ª through the crank shaft, there being a belt shifter 26 for shifting the belt off and on the pulley. The inlet valve 12, it will be readily understood, is unseated to admit the milk to the cylinder as the piston travels upwardly. The down stroke of the piston unseats the upper valve 15, and thus traps the milk above the piston.

I claim:

In a milk pump, a dome-shaped cylinder having an air chamber in the upper end thereof and provided with an outlet therefrom, in combination with a sub-base upon which said cylinder is removably supported, said sub-base providing on its upper surface a valve seat inclosed by the lower end of the cylinder, and a suction or inlet chamber, a hub extending through the axis of said sub-base and integral therewith, said hub extending above the upper surface of said sub-base and providing an inner valve seat therearound in a plane coinciding with the valve seat on the upper surface of the sub-base, an inlet valve adapted to simultaneously engage said valve seats so formed on the hub and the sub-base, said valve being supported and guided upon the portion of the hub extending above the sub-base, a piston having a rod extended downwardly through said hub, and an outlet valve carried in said piston.

In testimony whereof I affix my signature, in presence of two witnesses.

CHARLES O. LUCAS.

Witnesses:
  MATTHEW SIEBLER,
  C. M. THEOBALD.